UNITED STATES PATENT OFFICE.

JOHN D. SMITHERS, OF FILLMORE, MISSOURI

PROCESS OF PRESERVING EGGS.

No. 912,909.   Specification of Letters Patent.   Patented Feb. 16, 1909.

Application filed May 26, 1908. Serial No. 435,046.

*To all whom it may concern:*

Be it known that I, JOHN D. SMITHERS, a citizen of the United States, residing at Fillmore, in the county of Andrew and State of Missouri, have invented new and useful Improvements in Processes of Preserving Eggs, of which the following is a specification.

This invention is an improved method of and compound for preserving eggs, as hereinafter described and claimed. In carrying out this improved method for preserving eggs, a compound is prepared of the following ingredients, to wit:

Water................  1 gallon.
    Quick lime...........  6⅔ ounces.
    Chlorid of sodium    2⅔ ounces.
    Cream of tartar....   1 ounce.
    Bicarbonate of
       soda.............  1 teaspoonful.

The quick lime, chlorid of sodium, cream of tartar and bicarbonate of soda are put in the water. The compound is ready for use as soon as the lime has slaked and the other ingredients have dissolved. The eggs to be preserved are placed in this compound for a period of about one hour, are then removed therefrom and when dried are dipped in melted lard or other water repellent material. The eggs thus treated may be kept for a long period of time in perfectly good condition. In experiments which I have made I have been able to preserve eggs by my improved method and by the use of my improved compound for a period of eighteen months.

Having thus described the invention, what I claim as new and desire to secure by Letters Patent is:—

1. The herein described method of preserving eggs consisting in subjecting the same to the action of an alkaline solution, drying such solution on the eggs and then dipping the eggs into melted grease.

2. The herein described method of preserving eggs consisting of subjecting the same to the action of a solution of quick lime, chlorid of sodium, cream of tartar and bicarbonate of soda in water, drying the eggs and then dipping the same in melted fat.

In testimony whereof I affix my signature in presence of two witnesses.

JOHN D. SMITHERS.

Witnesses:
 ELTIE A. DENNEY,
 E. E. DENNEY.